(12) United States Patent
Judge et al.

(10) Patent No.: US 9,644,730 B2
(45) Date of Patent: May 9, 2017

(54) DEMOUNTABLE COUPLING SYSTEM AND APPARATUS

(71) Applicant: Global Research Innovation and Technology Inc., Cambridge, MA (US)

(72) Inventors: Benjamin Michael Judge, Cambridge, MA (US); Amos Greene Winter, V, Somerville, MA (US)

(73) Assignee: Global Research Innovation and Technology Inc., Boston, MA (US)

( * ) Notice: Subject to any disclaimer, the term of this patent is extended or adjusted under 35 U.S.C. 154(b) by 51 days.

(21) Appl. No.: 14/870,979

(22) Filed: Sep. 30, 2015

(65) Prior Publication Data

US 2016/0069445 A1 Mar. 10, 2016

Related U.S. Application Data

(60) Provisional application No. 62/032,989, filed on Aug. 4, 2014.

(51) Int. Cl.
| | | |
|---|---|---|
| *F16H 55/30* | (2006.01) | |
| *A61G 5/10* | (2006.01) | |
| *A61G 5/02* | (2006.01) | |
| *B60B 27/00* | (2006.01) | |
| *F16D 1/10* | (2006.01) | |

(52) U.S. Cl.
CPC .............. *F16H 55/30* (2013.01); *A61G 5/023* (2013.01); *A61G 5/1083* (2016.11); *B60B 27/0021* (2013.01); *F16D 1/10* (2013.01)

(58) Field of Classification Search
CPC ...... A61G 5/1083; A61G 5/023; A61G 5/025; B60B 27/026

USPC ............ 301/111.05, 111.06, 121, 124.2, 125
See application file for complete search history.

(56) References Cited

U.S. PATENT DOCUMENTS

| | | | | |
|---|---|---|---|---|
| 4,274,651 A | * | 6/1981 | Dumont ................. | A61G 5/023 192/93 R |
| 4,301,903 A | | 11/1981 | Nakano | |
| 5,482,305 A | * | 1/1996 | Jeffries .................. | A61G 5/023 280/250.1 |
| 5,727,850 A | * | 3/1998 | Masclet ................... | A61G 5/10 301/111.03 |
| 6,648,354 B2 | | 11/2003 | James | |
| 6,807,465 B2 | | 10/2004 | Ulrich et al. | |
| (Continued) | | | | |

FOREIGN PATENT DOCUMENTS

FR 2548096 A1 * 1/1985 ............... A61G 5/10

OTHER PUBLICATIONS

PCT International Search Report and Written Opinion issued in International Application No. PCT/US2015/053290 mailed Jan. 6, 2016.

*Primary Examiner* — Kip T Kotter
(74) *Attorney, Agent, or Firm* — Greenberg Traurig, LLP; Chinh H. Pham; Robert L. Hover

(57) ABSTRACT

Example embodiments are related to a wheel coupling system for a vehicle. The wheel coupling system according to example embodiments may include a torque transmission element having a rotatable member to generate a torque force and a torque receiver for releasably engaging the torque transmission element. The wheel coupling system may further include a wheel coupled to the torque receiver such that removal of the wheel disengages the torque receiver from the torque transmission element to allow the torque transmission element to remain intact.

20 Claims, 14 Drawing Sheets

(56) References Cited

U.S. PATENT DOCUMENTS

| | | | |
|---|---|---|---|
| 7,571,966 B2* | 8/2009 | Chen | B60B 1/006 |
| | | | 301/111.01 |
| 7,780,179 B2 | 8/2010 | Brown | |
| 2002/0036427 A1* | 3/2002 | Melgarejo | A61G 5/10 |
| | | | 301/111.06 |
| 2002/0101054 A1 | 8/2002 | James | |
| 2003/0018417 A1 | 1/2003 | Ulrich et al. | |
| 2008/0164672 A1 | 7/2008 | Brown | |
| 2013/0015632 A1* | 1/2013 | Winter, V | B62M 3/00 |
| | | | 280/244 |

* cited by examiner

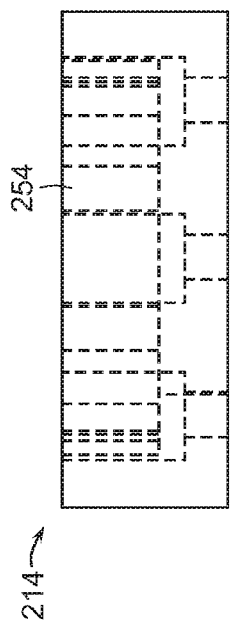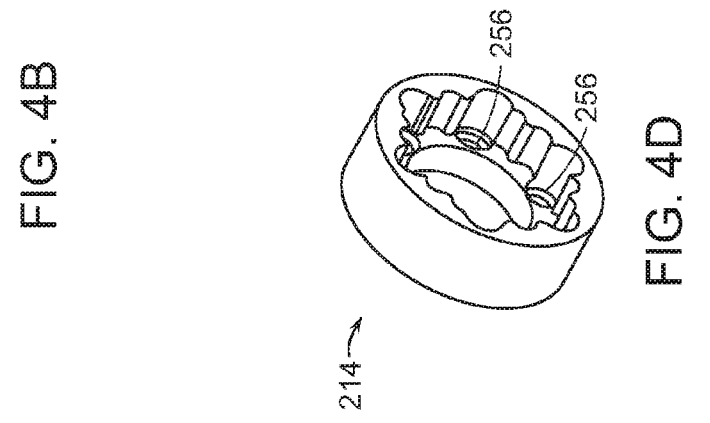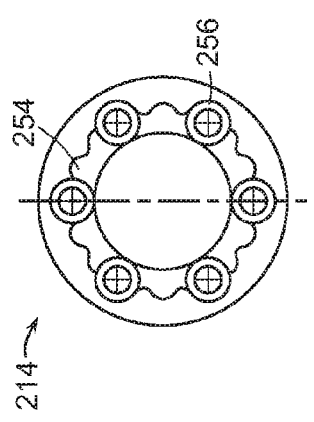

DEMOUNTABLE COUPLING SYSTEM AND APPARATUS

CROSS-REFERENCE TO RELATED APPLICATION

This application claims priority to U.S. Provisional Patent Application No. 62/032,989, entitled "Quick and Tool-Free Demountable Coupling", filed on Aug. 4, 2014, which is hereby incorporated by reference for all purposes.

TECHNICAL FIELD

Example embodiments relate generally to torque transmissions and rotating wheel elements, more particularly, to demountable coupled cantilevered rotating elements. The present invention relates, in particular, to the use of a demountable rotating member and a torque transmission element, where the demountable rotating member can readily removed from a vehicle without removing any components of the torque transmission element.

BACKGROUND

Conventional machine elements are often cantilevered for access and clearance, among other reasons. However, fixing torque transmission elements to rotating cantilevered elements often prevents demountable coupling, as in the case with a typical wheel and brake assembly of a bicycle.

It is even more difficult when the demountable coupling is to be decoupled and recoupled frequently, quickly, and/or by end users that may have impaired dexterity and limited functional manipulation ability. Further, the elements cannot be removed without additional tools. Tool-less quick release torque coupling exist, generally relying on features that permit translation in the axial direction such as keyways or splines. Generally, this functionality adds significant cost premium and the components are not end user serviceable.

Accordingly, there is a need for a wheel coupling system or apparatus that is both simplistic to construct and assemble, and inexpensive and easy to maintain and repair.

SUMMARY OF THE INVENTION

The present disclosure is direct to a wheel coupling system or apparatus that can be used in conjunction with among other things, a wheelchair, a bicycle, or other similar vehicles. The coupling system, in various embodiments, may include a torque transmission element having a rotatable member to generate a torque force; a torque receiver for releasably engaging the torque transmission element; and a wheel coupled to the torque receiver such that removal of the wheel disengages the torque receiver from the torque transmission element to allow the torque transmission element to remain intact.

In one embodiment, the torque transmission element of the coupling system may further include a first wheel coupling component and a second wheel coupling component coupled to the rotatable member, the first and second wheel coupling components having threaded surfaces to facilitate the transmission of the torque force.

In another embodiment, the rotatable member of the coupling system can be a freewheel equipped with directional threads for transmitting the torque force to the first and/or second wheel coupling component.

The first wheel coupling component, in various embodiments, may also include a bearing portion for facilitate a complementary coupling with the torque receiver.

In another embodiment, the first wheel coupling component can further include a threaded portion for receiving the torque force from the rotatable member.

In some embodiments, the torque transmission element of the wheel coupling system may include an axle receiver with a receiving section for providing support to the first wheel coupling component, the second wheel coupling component and the rotatable member.

In yet another embodiment, the torque receiver of the wheel coupling system can include a recess for facilitate a complimentarily coupling with the torque transmission element.

In one exemplary embodiment, the wheel coupling system may further include a wheel hub, where the wheel hub can have an interface portion for coupling the wheel hub to the torque receiver and also for receiving the torque force from the torque receiver.

In another aspect, the present disclosure is direct to a torque transmission apparatus for rotating a wheel. The torque transmission apparatus may include a rotatable member for generating a torque force, the rotatable member having an outer surface serving as a force applying surface and along which torque forces can be applied from a chain coupled to the receiving surface. The apparatus may also include a torque transferring member coupled to the rotatable member, the torque transferring member having a bearing section for transferring the generated torque force. Furthermore, the apparatus may include a torque receiver complementarily coupled to the torque transferring member for receiving the generated torque force, such that a removal of the torque receiver from the torque transferring member leaves the torque transferring member and the rotatable member intact.

In one embodiment, the rotatable member of the apparatus can be a freewheel having a threaded surface to facilitate a coupling to the torque transferring member.

In another embodiment, the outer surface of the freewheel may include a plurality of gear teeth for facilitate a coupling with the chain.

In some embodiments, the torque transferring member of the apparatus may further include a thread section for engaging a second torque transferring member.

The second torque transferring member, in various embodiments, may include a bearing section for a complementary coupling with the torque receiver.

In one embodiment, the torque receiver of the apparatus may further include a hollowed center for accommodating a portion of an axle.

The torque receiver, in various embodiments, may further include a recess for complementary coupling with a wheel hub, where the wheel hub may have an interface section for receiving the torque force from the torque receiver.

In another embodiment, the torque receiver of the apparatus may further include a plurality of bolt bores for accommodating one or more bolts.

In yet another aspect, the present disclosure is directed to a method for removing a wheel from a vehicle. The method may include locating an engagement mechanism for connecting a wheel to a torque transmission element, the torque transmission element having a rotatable member rotatably actuated by a chain for generating torque forces to rotating the wheel; actuating the engagement mechanism to disengage the connection between the wheel and the torque transmission element; and removing the wheel from the torque transmission element while leaving the torque transmission element intact and coupled to the chain.

In one embodiment, the step of locating an engagement mechanism may include identifying and locating a push button for releasing a locking mechanism from locking the wheel to the torque transmission element.

In another embodiment, the step of actuating the engagement mechanism may include pushing the push button to release the locking mechanism from locking the wheel to the torque transmission element.

In yet another embodiment, step of removing the wheel may include removing an axle from the torque transmission element, the axle having a locking mechanism for locking the axle with the torque transmission element.

BRIEF DESCRIPTION OF THE DRAWINGS

Illustrative, non-limiting example embodiments will be more clearly understood from the following detailed description taken in conjunction with the accompanying drawings.

FIGS. 4A-4D are diagrams illustrating a torque receiver according to one embodiment of the present invention.

DETAILED DESCRIPTION OF THE EMBODIMENTS

Figure 1A:
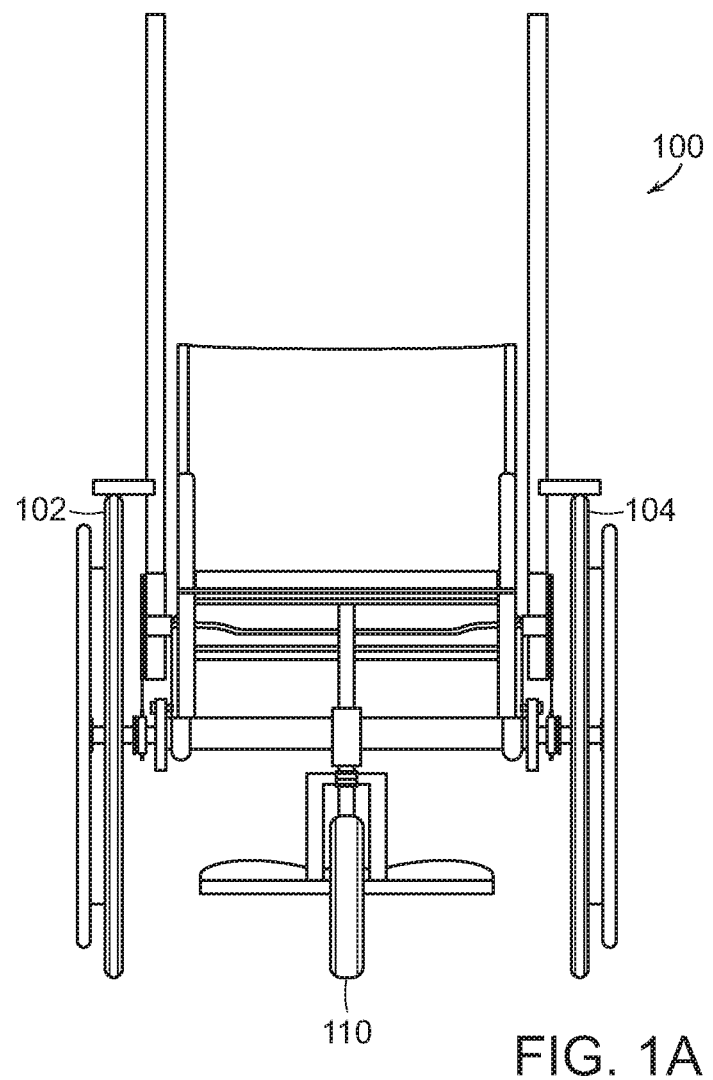
FIGS. 1A-1C are diagrams illustrating a wheelchair utilizing a coupling system according to one embodiment of the present invention.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
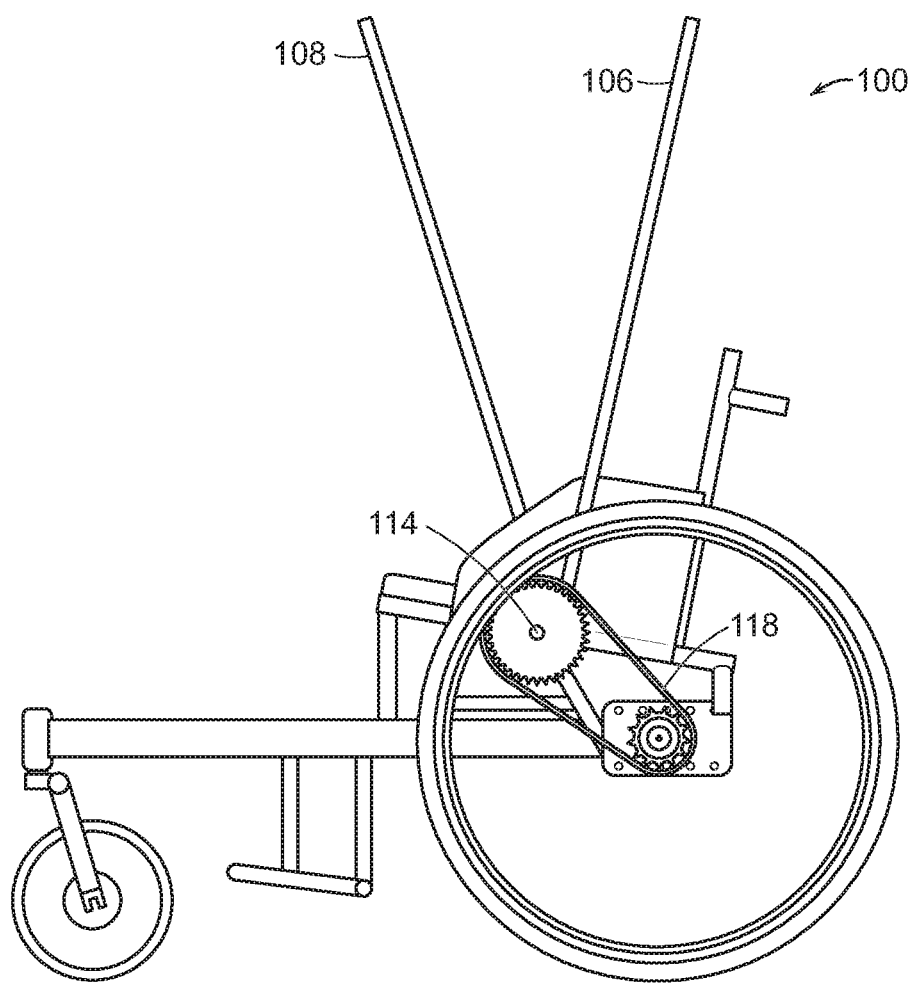
Figure 1C:
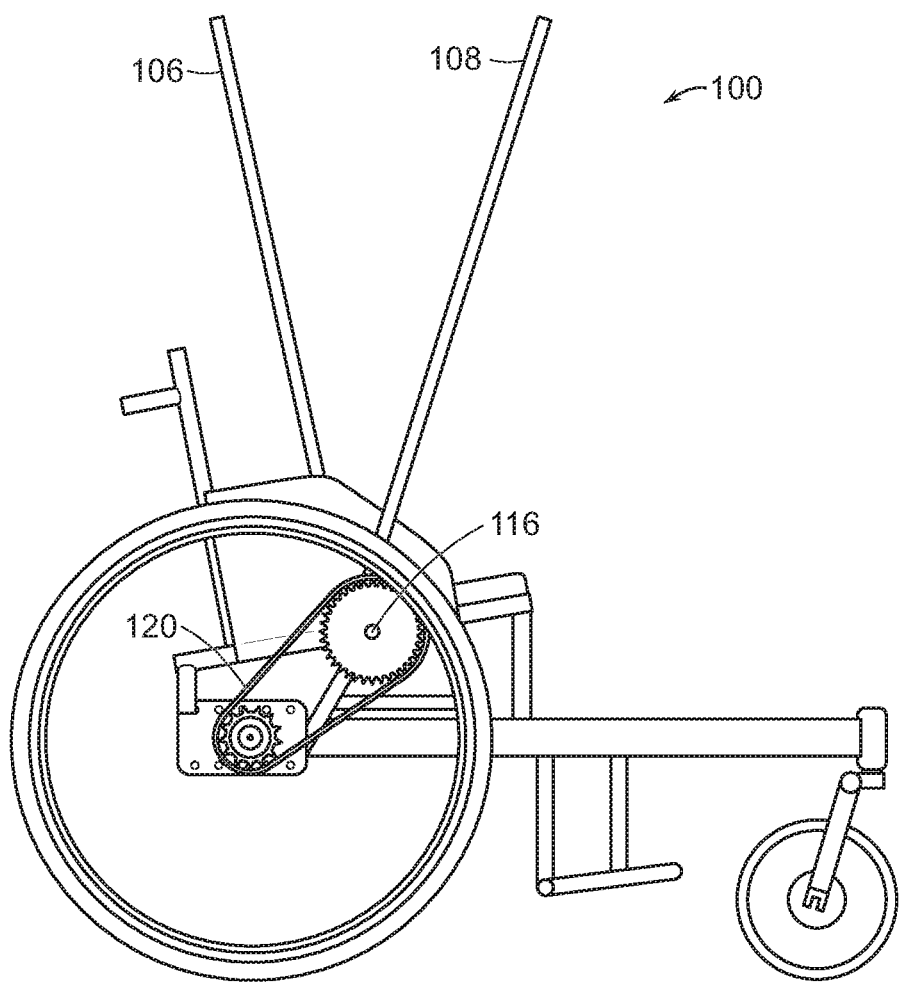
Figure 2:
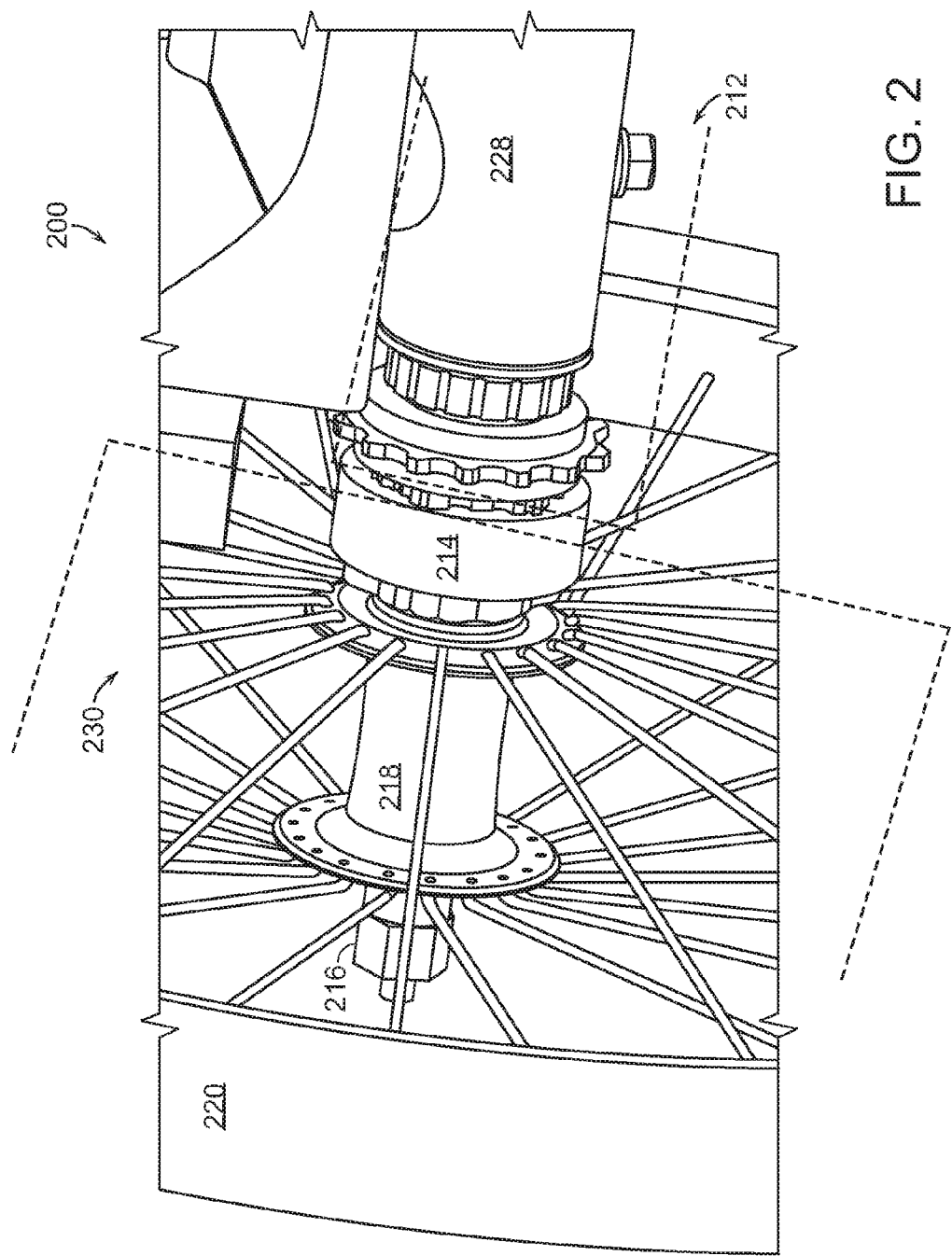
FIG. 2 is a diagram illustrating a rotating element being connected to a torque transmission element according to one embodiment of the present invention.
Figure 3:
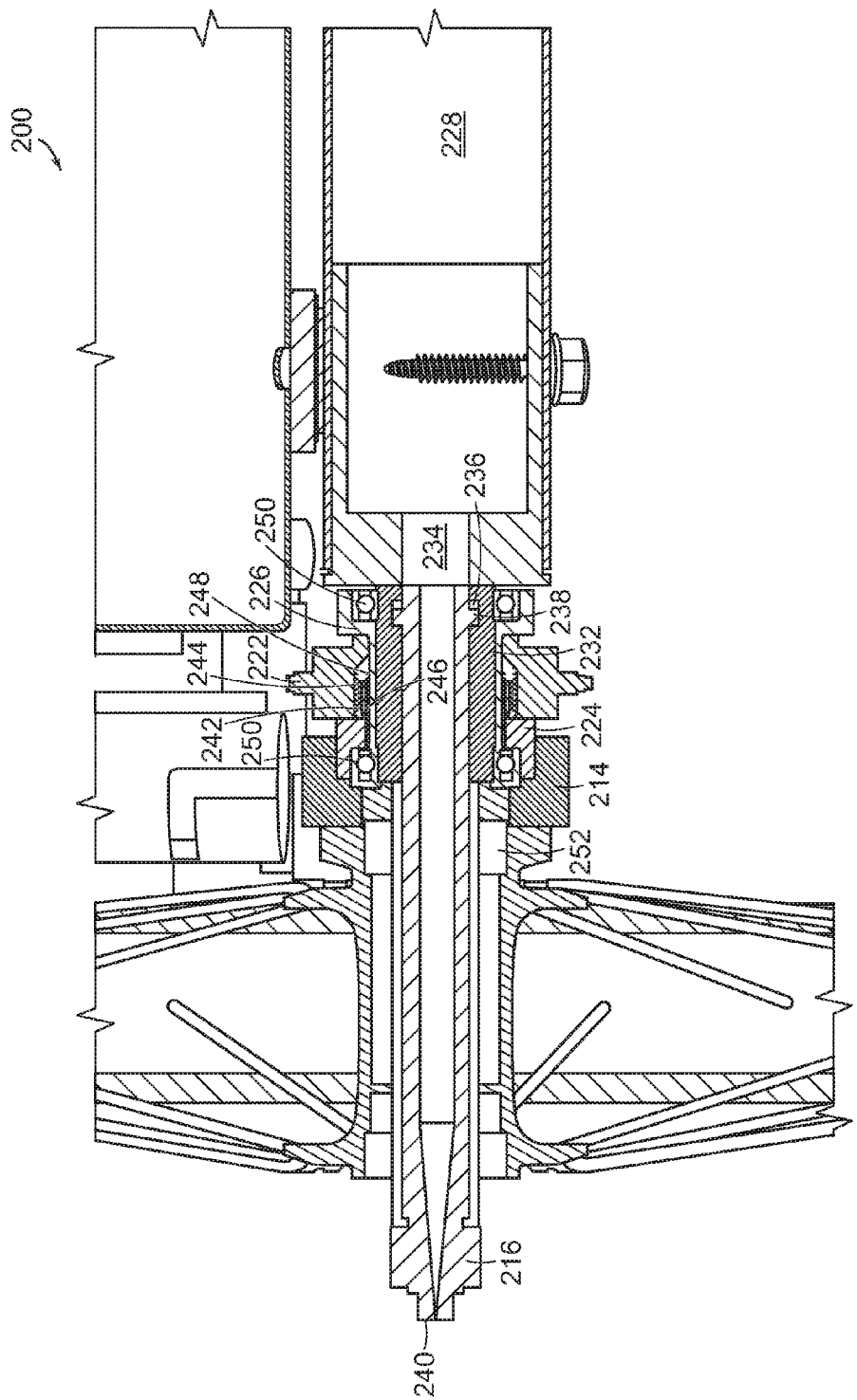
FIG. 3 is a cross section diagram illustrating the rotating element being connected to the torque transmission element according to one embodiment of the present invention.

Embodiments of the present disclosure generally provide demountable coupling systems and apparatuses for generating and transmitting torque forces to rotate a wheel. The various embodiments of the present disclosure can be used for vehicles where a rotational torque is transferred to one or more wheels by a torque transmission element, examples of such vehicles include, but not limited to, wheelchairs, bicycles, tricycles, motorcycles and rickshaws, etc. For example, FIGS. 1A-1C illustrate a wheelchair 100 actuatable by two levers and utilizes an exemplary embodiment of a demountable coupling system, in accordance with the present disclosure, to rotate two larger wheels 102, 104, where a third wheel 110 can be optionally added to provide stability to wheelchair 100 over tough terrain and thus resistance to tipping. Looking at FIGS. 1B and 1C, on each side of the wheelchair 100 is a drive lever 106, 108 which can be pushed (i.e., pumped) by a user using hands. In one embodiment, drive levers 106, 108 can each be fixed to a coupling tube and a coupling plate (not shown), where the coupling plate can be further fixed to a toothed gear or chainring 114, 116. As such, pumping the levers 106, 108 in a forward fashion can induce the chainrings 114,116 to rotate accordingly and thereby generate a rotational torque force. Furthermore, torque forces generated by the levers 106, 108 and chainrings 114, 116 can be transmitted to the wheels 102, 104 to propel the wheelchair 100 to move in various directions. In one embodiment, torque transferring members such as chains 118, 120 can be used to connect the chainrings 114, 116 to coupling system, such as a coupling system 200 as illustrated in FIGS. 2 and 3 for the transmission of the generated torque force. As shown in FIGS. 1B and 1C, chains 118, 120 can wrap around chainrings 114, 116 at one end and be coupled to a rotatable member, such as a freewheel, of the coupling systems 200 at another end.

In one embodiment, the coupling system 200 can be connected to the wheels 104 using one or more removable axles, and torque forces can be transmitted from the coupling system 200 to the wheel 104 to propel the wheelchair 100 to move forward. FIG. 2 illustrates an exemplary configuration of a coupling system 200 and parts thereof. It should be understood that the components of coupling system 200 and parts thereof shown in FIG. 2 are for illustrative purposes only, and that any other suitable components or subcomponents may be used in conjunction with or in lieu of the components comprising the coupling system 200 and the parts of demountable coupling system 200 described herein.

As illustrated in FIG. 2, coupling system 200 can include a torque transmission element 212 configured to transmit a torque force generated by the lever 106 and the chainring 114 (as shown in FIGS. 1A-1C) to a wheel hub 218. The torque transmission element 212 can be receivably coupled to a rotating element 230 of the wheelchair 100. In one embodiment, the rotating element 230 can include the wheel hub 218 and a torque receiver 214 configured to receive the torque force generated by the lever 106 and chainring 114. Furthermore, a removable axle 216 can extend through the wheel hub 218 and the torque transmission element 212, effectively connecting the wheel hub 218 with the torque transmission element 212 and provides support to the rotating wheel hub 218. In addition, the torque transmission element 212 can also include an axle receiver 228 configured to house and provide support to the removable axle 216. In one embodiment, a wheel 220 (similar to the wheels 102, 104 illustrated in FIGS. 1A-1C) can be coupled to and supported by the wheel hub 218, as illustrated in FIG. 2, where rotating the wheel hub 218 also rotates the wheel 220.

It should be appreciated that although illustrated as being fitted onto the left side of the wheelchair 100, both the torque transmission element 212 and the rotating element 230 can also be readily used, fully intact, on the right side of the wheelchair 100. Still looking at FIG. 2, the torque transmission element 212 can include a rotatable member 222 configured to generate or transmit a rotational torque force for actuating the wheel hub 218. In one embodiment, the rotatable member 222 can be a freewheel 222 equipped with gear teeth or pawls for engaging a torque transferring member such as a chain (as illustrated in FIGS. 1A-1C). In one embodiment, the freewheel 222 can be further coupled to a first and second wheel coupling components 224, 226 and a generated torque force transmitted through the chain can induce the freewheel 222 and the coupling components 224, 226 to rotate about the axle receiver 228. The first wheel coupling component 224 can include a bearing portion (as illustrated in more details below in FIGS. 5A-5C) designed to be complimentarily fitted into a recess portion of the torque receiver 214 (as illustrated in more details below in FIGS. 4A-4C), this complementary fit can be designed such that the bearing portion can be securely wedged inside the recess portion, such that rotating the first wheel coupling component 224 induces a rotation of the torque receiver 214, thereby effectively transmitting the generated torque force from the first wheel coupling component 224 to the torque receiver 214. In another embodiment, the torque receiver 214 can be bolted (as illustrated in more details below in FIGS. 4A-4C) onto the wheel hub 218 and rotating the torque receiver 214 will propel the wheel hub 218 and the wheel 220 to also rotate accordingly.

It should be noted that the coupling or de-coupling of the torque transmission element 212 to the rotating element 230 can be accomplished free of additional tools, which advantageously allows a user to easily assemble or disassemble the wheel chair 100 in the field. In order to perform the tools free decoupling (or coupling), the torque receiver 214 can be designed in a way such that the first wheel coupling component 224 can be complementarily fitted into the torque receiver 214. To further facilitate the easy to perform, tools free decoupling process, the removable axle 216 and the wheel hub 218 can be dislodged from the torque transmission element 212 by release of an engagement element designed to lock the removable axle 216 to the axle receiver 228 of the torque transmission element 212. Furthermore, another advantage provided by the present invention is that both the torque transmission element 212 and the rotating element 230 can be conveniently constructed using prevalently available over the shelf bicycle components, which allows the wheelchair 100 to be constructed or repaired in regions with limited supplies of necessary parts and tools. For example, the rotatable member 222 can be an off the shelf spring ratchet and pawl type freewheel equipped with different number of gear teeth and pawls for caster engagement with a torque transferring member.

In one embodiment, the axle receiver 228 can include a receiving section 232 designed to accommodate and/or support a portion of the removable axle 216. In one embodiment, the axle receiver 228 can have a pathway 234 extending through a substantial portion of the receiving section 232 with a recess 236 positioned along the pathway 234 for accommodating a locking detent 238 positioned on the removable axle 216. To lock the removable axle 216 in place, the locking detent 238 can protrude from the removable axle 216 and rest into the recess 236.

FIG. 3 is a cross-section diagram illustrating the coupling system 200 according to one embodiment of the present invention. Looking at FIG. 3, the rotating element 230 can be connected to the torque transmission element 212 at the removable axle 216 and/or at the torque receiver 214. In one embodiment, the torque receiver 214 can include a recess designed to complimentarily receive the bearing section of the first wheel coupling component 224, where the bearing section is designed to rest against the inner surfaces of the recess and transmit torque forces to the torque receiver 214. In addition to the torque receiver 214 and first wheel coupling component 224 engagement, the removable wheel axle 216 can also lock into the axle receiver 228 to provide additional connection between the rotating element 230 and the torque transmission element 212. In one embodiment, the removable axle 216 can include a spring activated button 240 designed to retract or protrude the locking detent 238.

In one embodiment, a user can slide the removable axle 216 into the pathway until the locking detent 238 locks into the recess 236, at which point the removable axle 216 can be securely positioned inside the pathway 234 and the pathway 234 can provide support to the axle 216. To remove the axle 216 from the axle receiver 228, the user can push the button to actuate (retract) the locking detent 238 followed by sliding the axle 216 out of the pathway 234. Still looking at FIG. 3, the freewheel 222 can include a thread section 244 configured to be coupled to an outward facing thread section 242 of the first wheel coupling component 224, where this threads to threads engagement is configured to transmit generated torque forces to the first wheel coupling component 224. In addition, the first wheel coupling component 224 can also include an inward facing thread portion 246 designed to be coupled to a thread portion 248 of the second wheel coupling component 226, where this engagement between the first and second wheel coupling components 224, 226 is designed to tighten over time as the freewheel 222 and the coupling components 224, 226 rotate about the axle receiver 228. Furthermore, the first and second wheel coupling components 224, 226 can each be fitted with a ball bearing 250, at a recess located at the coupling components' bearing sections, where the ball bearing 250 can be sliding fitted on to the receiving section 232 of the axle receiver 228 and thereby allowing the coupling components 224, 226 to rotate about the axle receiver 228. In one embodiment, the ball bearing 250 can be a 6805 ball bearing commonly used in bicycles, and the ball bearings 250 can be retained by a retaining ring.

In an embodiment, a torque force can be firstly transmitted by the freewheel 222 to the first wheel coupling component 224 through the engagement of the two threaded sections 242, 244. Subsequently, this torque force can be further transmitted by the first wheel coupling component 224 to the torque receiver 214 through the engagement or coupling between the bearing section of the first wheel coupling component 224 and the recess of the torque receiver 214.

In some embodiments, the torque receiver 214 can be fixed to the wheel hub 218 using one or more bolts. For example, the wheel hub 218 can include a bolt interface 252, such as an ISO 6 bolt interface, where one or more standard M5 torx head machine screws normally used in bicycle hub applications can be used to mount the torque receiver 214 to the ISO 6 bolt interface. FIGS. 4A-4D are diagrams illustrating an exemplary configuration of the torque receiver 214 according to embodiments of the present invention. As illustrated in FIG. 4A, the torque receiver 214 can include a recess 254 configured to complimentarily accommodate a bearing section of the first wheel coupling component 224. To better assist the transmission of the generate torque forces, the recess 254 can be further configured to include curvatures along the edges of the recess 254 designed to securely lodge the bearing section (of the first wheel coupling component 224) in place. Furthermore, one or more bolt bores can be positioned inside the recess designed to attach the torque receiver 214 to the bolt interface 252 section of the wheel hub 218, as also shown in cross section diagrams of the torque receiver 214 in FIGS. 4B and 4C. FIG. 4D is a side view of the torque receiver 214 showing curvatures along the recess 254 edge with bolt bores 256 positioned within the recess designed to accommodate bolts.

Figure 5B:
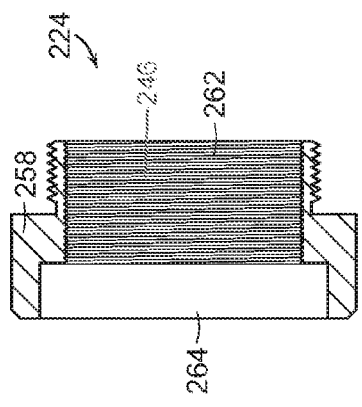
FIGS. 5A-5D are diagrams illustrating a first wheel coupling component according to one embodiment of the present invention.
Figure 5D:
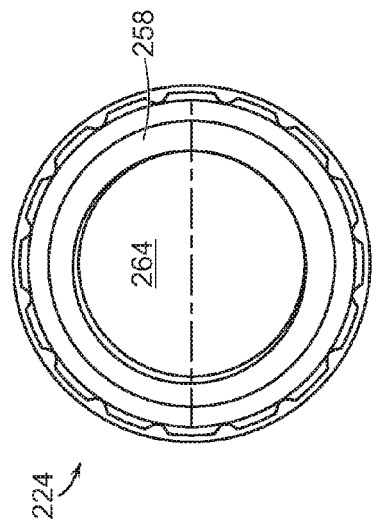
Figure 5A:
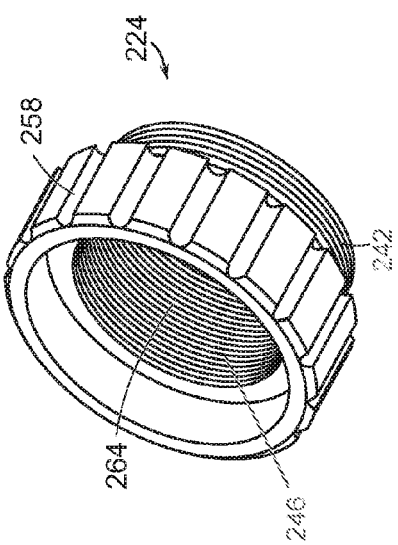
Figure 5C:
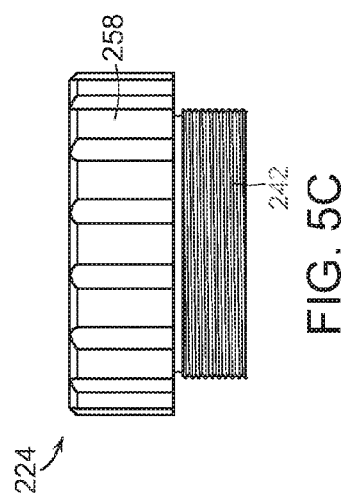

In one embodiment, on the left side of the wheelchair 100, the torque receiver 214 can be coupled to a bearing section of the first wheel coupling component 224 to receive generated torque forces from the torque transmission element 212. FIGS. 5A-5D illustrate an exemplary configuration of the first wheel coupling component 224 according to embodiments of the present invention. As shown in FIG. 5A, the first wheel coupling component 224 can include a bearing section 258 and a thread section 242, and also a hollowed center 264 designed to accommodate the receiving section 232 of the axle receiver 228 such that the first wheel coupling component 224 can rotate about the axle receiver 228 (as also illustrated in FIG. 5D). Looking at FIG. 5A, the bearing section 258 can further include bumps as for when the bearing section 258 is complimentarily fitted into the recess 254 of the torque receiver 214, the bumps can lodge firmly against the curvatures of the recess 254 (as shown in FIGS. 4A-4C) to facilitate a tight fit between the torque receiver 214 and the first wheel coupling component 224. In one embodiment, the first wheel coupling component 224 can be further coupled to another component, such as a freewheel at the thread section 242. The thread section 242 can include directional threads, as illustrated in FIGS. 5A and 5C, designed to thread onto another component with opposite directioned threads (such as the freewheel 222 shown in FIG. 3). In addition, the thread section 242 can also have threads on an inside surface for engaging additional mechanical components. FIG. 5B is a cross sectional diagram of the first wheel coupling component 224 having threads on an inner surface of the thread section 242. As illustrated, within the hollowed center 264, the walls of the center region 262 can be equipped with directional threads 246 designed to engage another component equipped with opposite directioned threads. For example, as illustrated in FIG. 3, the inner surface 262 of the first wheel coupling component 224 can be threaded into a threaded surface of the second wheel coupling component 226, where this engagement between the first and second wheel coupling components 224, 226 will be further reinforced as the torque transmission element 212 rotates about the axle receiver 228.

Figure 6B:
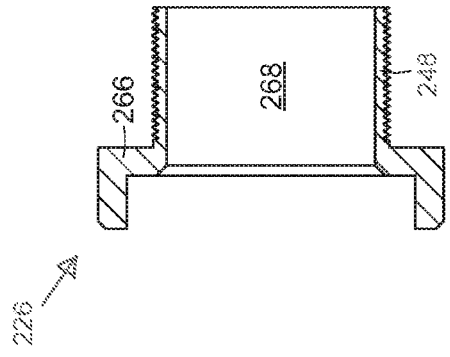
FIGS. 6A-6D are diagrams illustrating a second wheel coupling component according to one embodiment of the present invention.
Figure 6D:
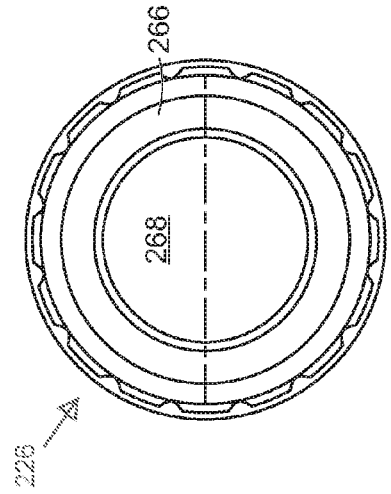
Figure 6A:
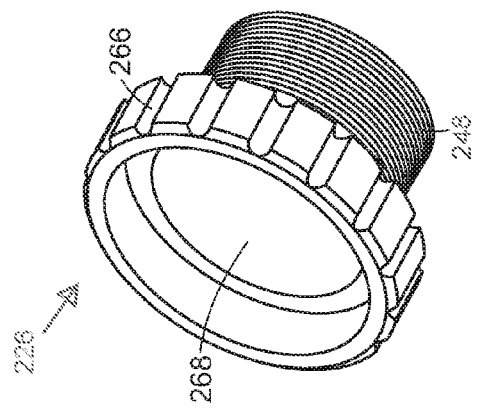
Figure 6C:
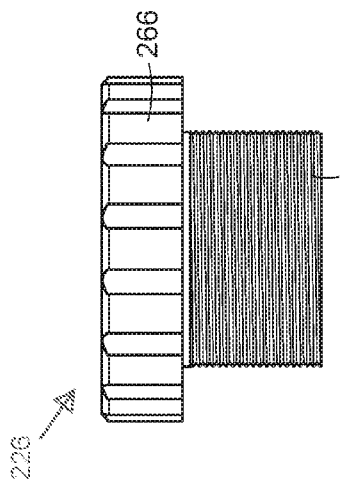

Similar in structure to the first wheel coupling component 224, as illustrated in FIGS. 6A-6D, the second wheel coupling component 226 can also include a bearing section 266 and a thread section 248, and a hollowed center 268 designed to accommodate the receiving section 232 of the axle receiver 228 such that the second wheel coupling component 226 can rotate about the axle receiver 228 (as illustrated in FIG. 6D). In one embodiment, the bearing section 266 can include bumps as for when the bearing section 266 is complimentarily fitted into the recess 254 of the torque receiver 214, the bumps can lodge firmly against the curvatures of the recess 254 (as shown in FIGS. 2 and 3) to facilitate a tight fit between the torque receiver 214 and the second wheel coupling component 226. Looking at FIGS. 6B and 6C, the thread section 248 can be equipped with directional threads designed to mate with other threaded surfaces to form a coupling. For example, as shown in FIG. 3, the thread section 248 can be coupled (threaded into) with the inner surface 262 of the first wheel coupling component 224, where such coupling can tighten over time as the torque transmission element 212 rotates about the axle receiver 228.

In one embodiment, as the second wheel coupling component 226 rotates about the receiving section 232 of the axle receiver 228 and the torque transmission element 212 transmits torque forces to the rotating element 230, the axle receiver 228 can also provide support to the rotating element 230 through at least one removable axle. FIGS. 7A-7D illustrate an exemplary configuration of the axle receiver 228 according to embodiments of the present invention.

Figure 7B:
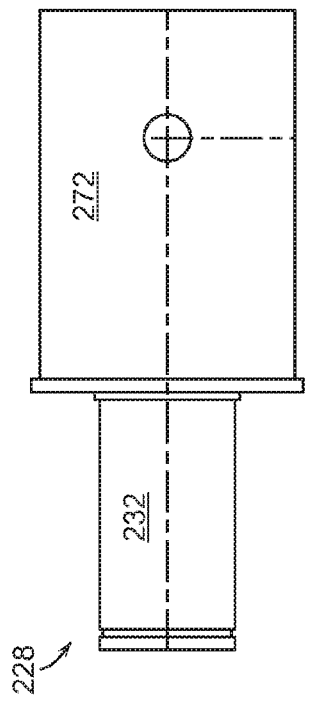
FIGS. 7A-7d are diagrams illustrating an axle receiver according to one embodiment of the present invention.
Figure 7D:
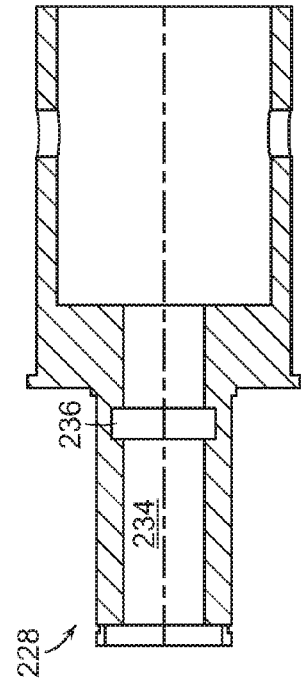
Figure 7A:
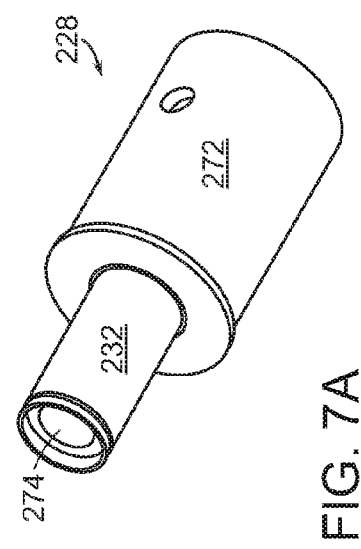
Figure 7C:
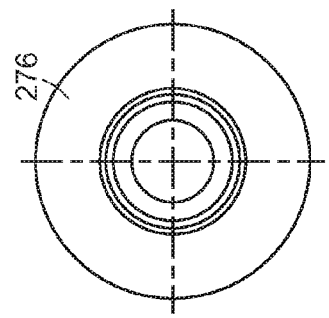

Looking at FIGS. 7A and 7B, the axle receiver 228 can include a body section 272 and a receiving section 232, where the body section 272 can be configured to attach the axle receiver 228 to the main frame of the wheelchair 100. The receiving section 232 can be of appropriate length such that the width of the entire wheelchair 100 assembly can easily fit through places with width restrictions such as doorways. In one embodiment, the receiving section 232 can include a recess 274 positioned proximally to the wheel hub 218 such that a portion of the wheel hub 218 can be receivably fitted into the recess 274, which can advantageously reduce the overall width of the wheelchair 100 assembly for easy access through tight spaces. Furthermore, an axle pathway 234 can extend through the receiving section 232 and configured to accommodate a portion of the removable axle 216. As illustrated in FIGS. 7C and 7D, the axle pathway 234 can be substantially straight in shape and has a recess 236 positioned along the pathway 234 designed to receive a locking detent 238 from the removable axle 216. In one embodiment, the locking detent 238 will slide and lock into the recess 236 and lock the removable axle 216 inside the axle pathway 234, thereby enabling the receiving section 232 to provide support to the axle 216.

Figure 8A:
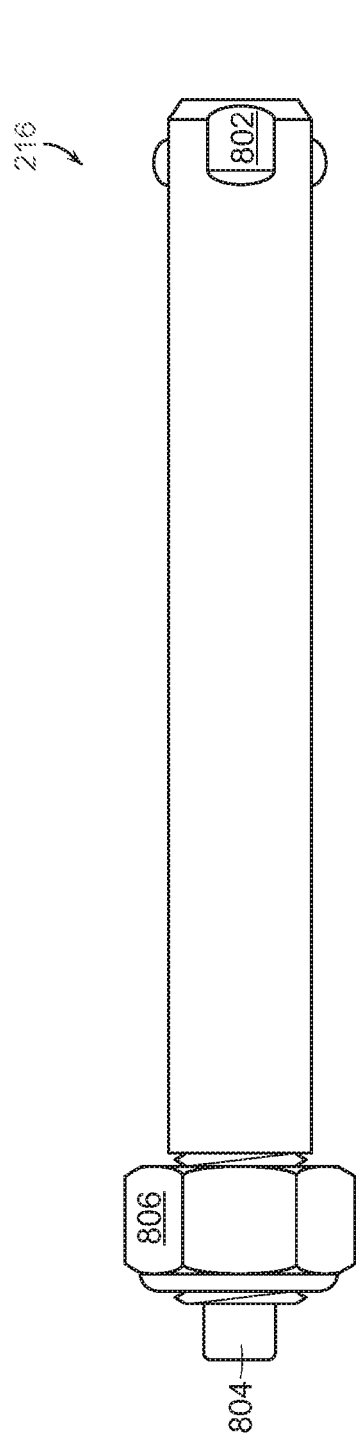
FIGS. 8A and 8B are diagrams illustrating an axle according to one embodiment of the present invention.
Figure 8B:
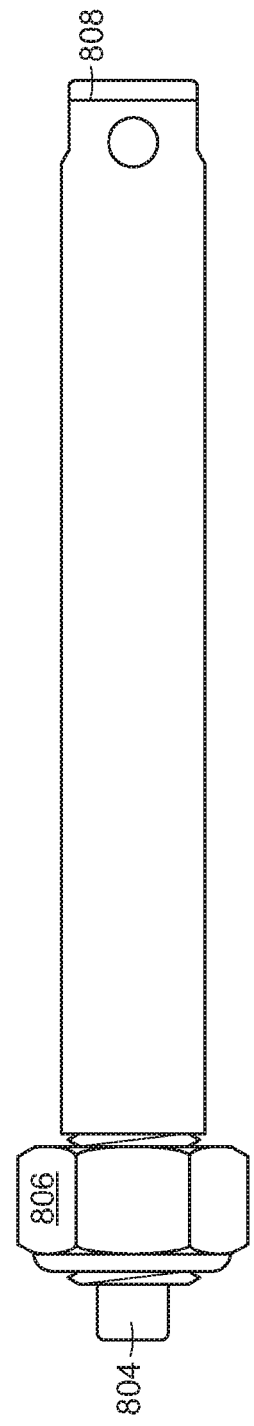

In some embodiments, the removable axle 216 can have dimensions that are in conformity with over the counter bicycle parts, thus allowing end users to easily replace the axle with standard bicycle parts. For example, the axle 216 can have a width of 15 mm, which is compatible with the 15 mm bicycle hub standard but wider than the current ½" wheelchair standard, therefore also making the axle 216 stronger than a standard wheelchair axle. FIGS. 8A and 8B are diagrams of an exemplary configuration of the axle 216 according to embodiments of the present invention. In one embodiment as illustrated in FIG. 8A, a removable axle 216 can have an substantially straight elongated body with a locking mechanism positioned at a proximal end of the elongated body, close to the axle receiver 228. The locking mechanism can be one or more stainless balls 802 actuatable by an actuation element, such as a push button 804 located at a distal end of the axle 216. The push button 804 can control the stainless balls 802 using control elements such as springs (not shown), where pushing the push button 804 can retract the stainless balls 802 into the removable axle 216 and out of the recess 236 (located within the axle receiver 228), as shown in FIG. 3. In addition, a retention member 806 such as a threaded nut can be positioned at the distal end proximal to the push button 804 designed to secure the removable axle 216 in place when the axle 216 is positioned inside the axle receiver 228. FIG. 8B is a diagram illustrating a side view of the removable axle 216 according to embodiments of the present invention. Looking at FIG. 8B, the axle 216 can further include wrench flats 808 at an end opposite from the retention member 806, the wrench flats 808 can be used to hold the axle 216 body while the retention member 806 is being adjusted.

Figure 9:
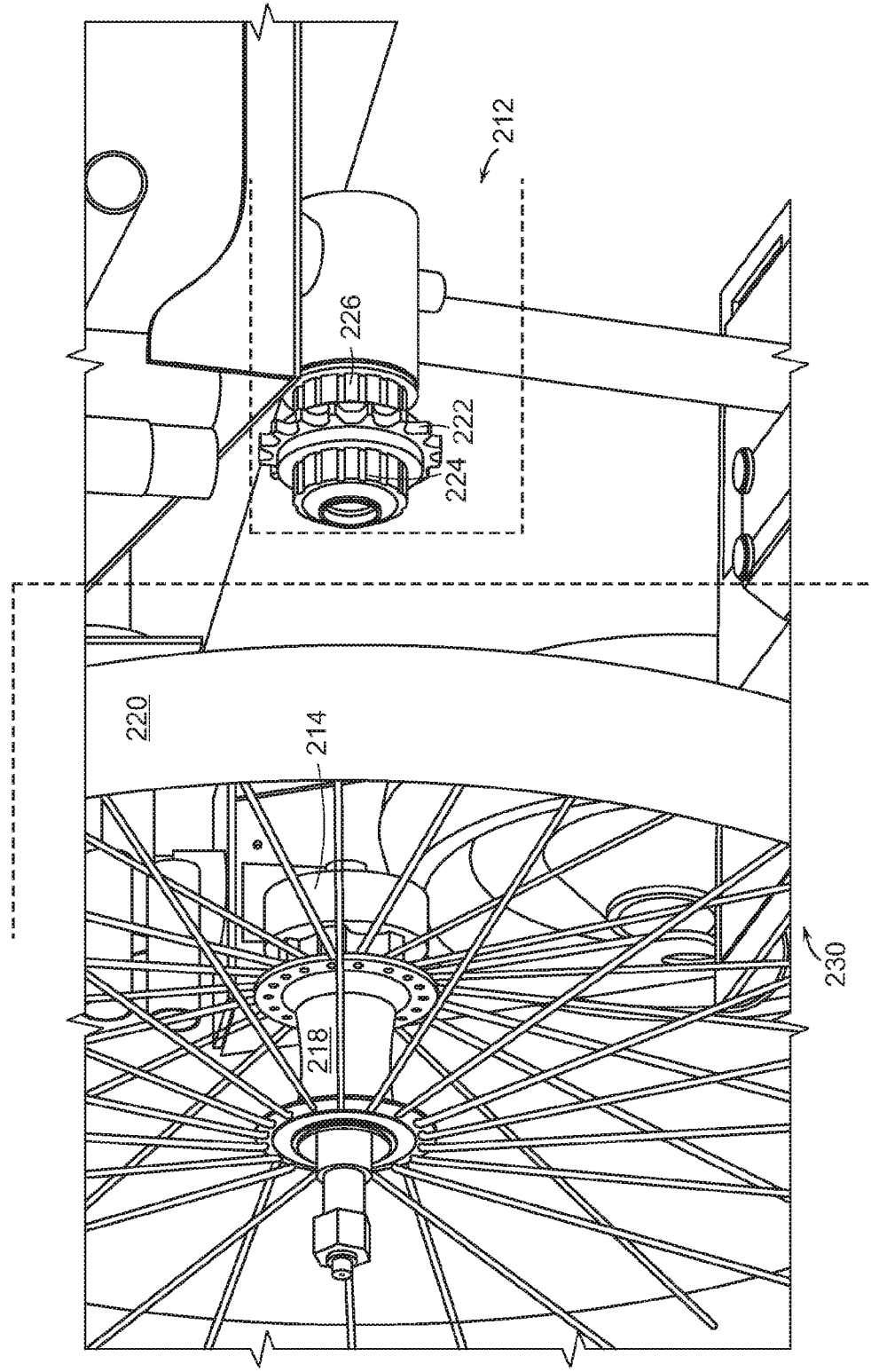
FIG. 9 is a diagram illustrating the rotating element being separated from the toque transmission element according to one embodiment of the present invention.

In embodiment, to de-couple or remove or separate the rotating element 230 from the torque transmission element 212 can be accomplished by actuate an engagement mechanism (such as the push button 804) designed to remove and separate the axle 216 from the axle receiver 228. In one embodiment, a user can firstly identify and locate the actuation or engagement mechanism and then proceed to actuate the engagement mechanism. For example, the user can firstly locate the push button 804, followed by pushing the button to retract the locking detents (stainless balls 802) out of the recess 236 (as illustrated in FIG. 7D) and back into the axle 216. Subsequently, the user can remove the axle 216 from the axle receiver 228 by sliding the axle out of the axle pathway 234 (as illustrated in FIG. 7D). While removing the axle 216 from the axle pathway 234, the torque receiver 214 is also simultaneously separated from the torque transmission element 212. FIG. 9 is a diagram illustrating the rotating element 230 being separated from the torque transmission element 212 according to embodiments of the present invention. Looking at FIG. 9, the rotating element 230 can be removed from the torque transmission element 212 fully intact. Specifically, the torque receiver 214 can remain bolted to the wheel hub 218 and the wheel 220 can similar remain attached to the wheel hub 218. More importantly, the removal of the rotating element 230, including the wheel 220, can be accomplished without tampering with the torque transmission element 212. The entire torque transmission element 212 can stay intact during the removal of the rotating element 230. Specifically, the freewheel 222 can stay coupled to the chain (not shown), the first and second wheel coupling components 224, 226 can stay coupled to each other and to the freewheel 222 as illustrated in FIGS. 2 and 3, and the entire torque transmission element 212 stays intact and attached to the wheelchair 100 during the removal of the wheel 220, as illustrated in FIG. 9. To be able to remove the rotating element 230 without using any tools and without the need to tamper with the torque transmission element 212 at all as described herein can be tremendously advantageous to users with limited man power and tools, not to mention the convenience it provides to a user to be able to remove a wheel from a wheelchair at the push of a button.

Figure 10:
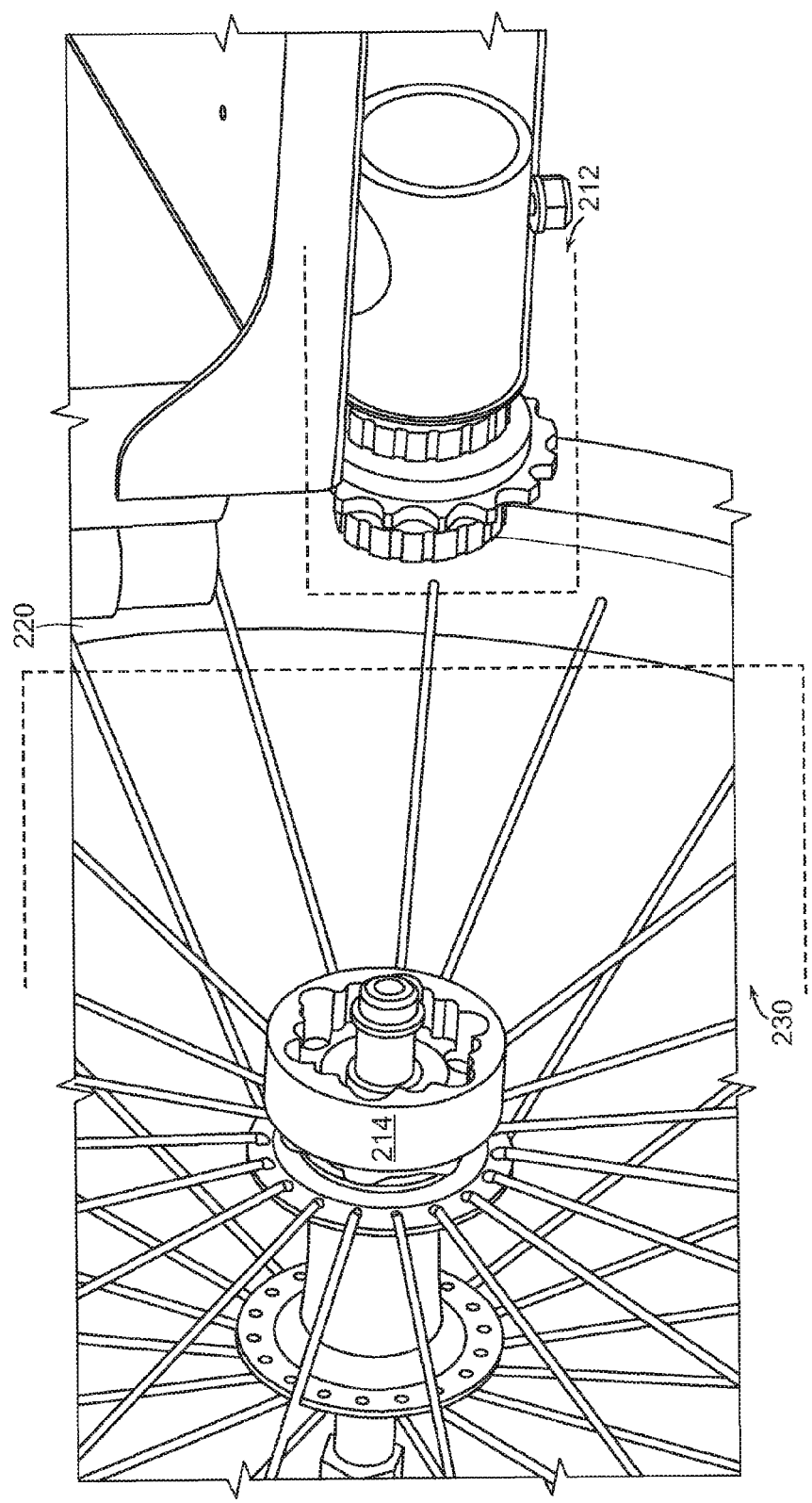
FIG. 10 is another diagram illustrating the rotating element being separated from the toque transmission element according to one embodiment of the present invention.

FIG. 10 is a diagram providing another perspective view of the rotating element 230 being separated from the torque transmission element 212. As illustrated in FIG. 10, after being removed from the torque transmission element 212, both the torque receiver 214 and the wheel 200 can remain attached to the wheel hub, the entire rotating element 230 can be removed intact. But more importantly, the rotating element 230 can be removed without the need to tamper with the torque transmission element 212 at all. Looking at FIG. 10, the torque transmission element 212 can remain entirely intact and coupled to the wheel chair, and the freewheel 222 remains coupled to a chain (not shown).

Figure 11:
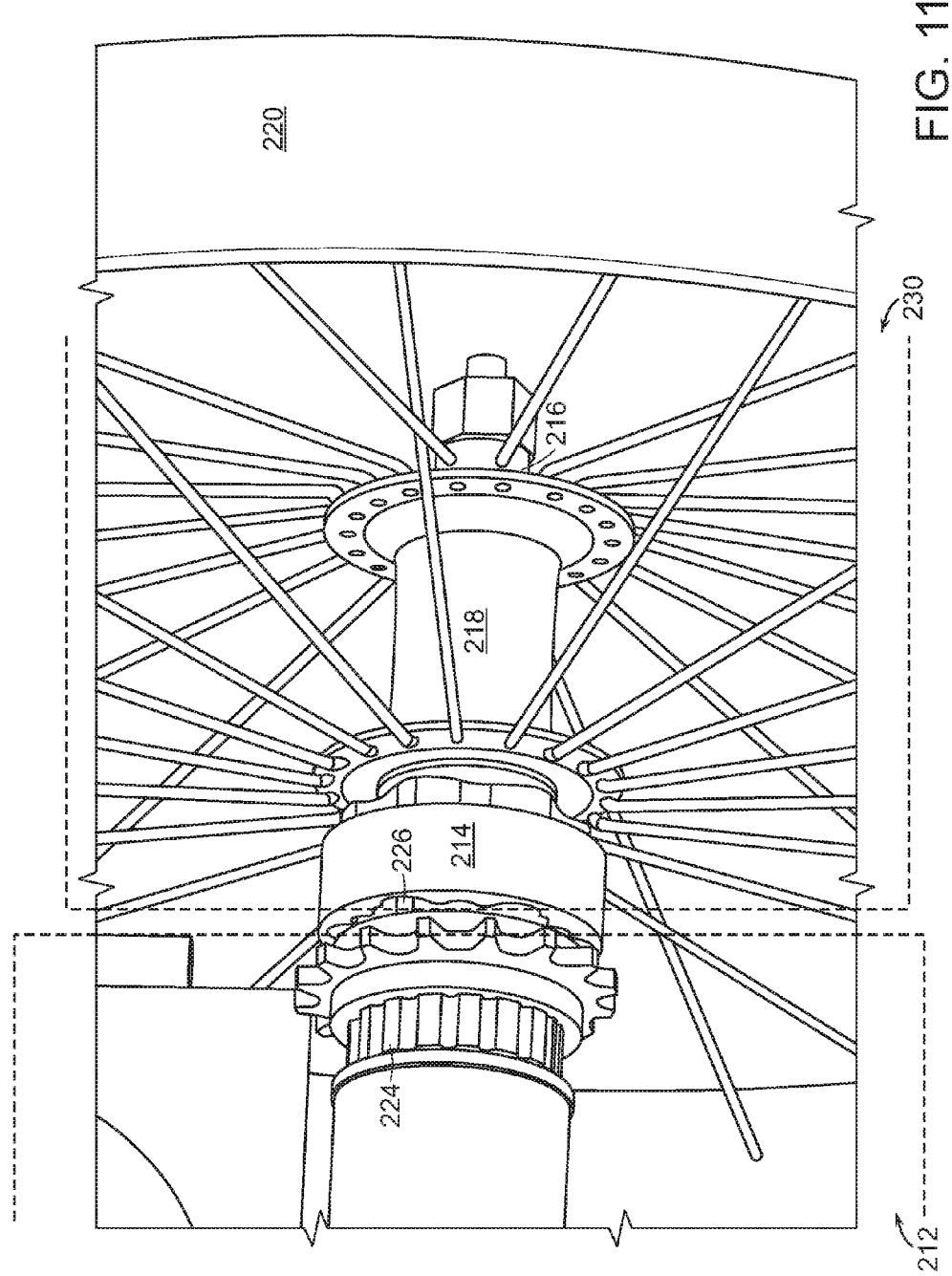
FIG. 11 is a diagram illustrating the rotating element and the torque transmission element being deployed on the right side of a vehicle according to one embodiment of the present invention.

It should be appreciated that both the torque transmission element 212 and the rotating element 230 as described herein can also be readily deployed, fully intact, on the right side of the wheelchair 100. The ability to be able to utilize the same components and unit configurations on both sides of a vehicle not only simplifies the design of the vehicle, but also greatly simplifies, as well as reduces the cost, of maintaining and/or repairing the vehicle, because a user can now use the same commonly used bicycle parts on both sides of the vehicle. FIG. 11 is a diagram illustrating the torque transmission element 212 and rotating element 230 being utilized on the right side of the wheelchair 100 according to embodiments of the present invention. Looking at FIG. 11, the same rotating element 212 and rotating element 230 can be readily deployed on the right side of the wheelchair 100, where the torque receiver 214 can be receivably coupled to the second wheel coupling component 226 and the axle 216 can extend through the wheel hub 218 and the axle receiver 228 and configured to provide support to the wheel 220.

Figure 12:
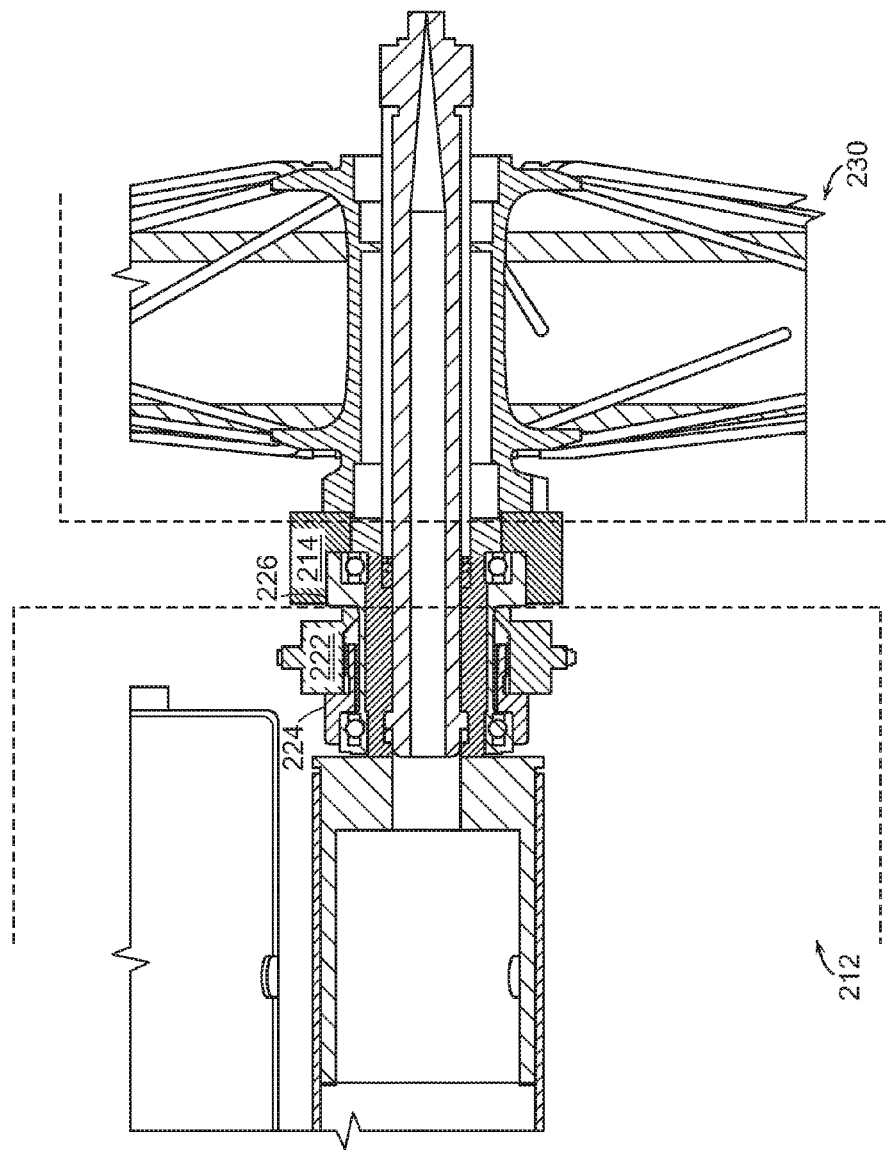
FIG. 12 is a cross section diagram illustrating the rotating element and the torque transmission element being deployed on the right side of a vehicle according to one embodiment of the present invention.

In one embodiment, a generated torque force can be transmitted from the second wheel coupling component 226 to the torque receiver 214 to propel the wheel 200. FIG. 12 is a cross section diagram illustrating the interaction between the torque transmission element 212 and the rotating element 230 on the right side of the wheelchair 100 according to various embodiments of the present invention. Looking at FIG. 12, the generated torque force can be firstly transmitted from the freewheel 222 to the first wheel coupling component 224, then through the threaded interface (as described in FIGS. 5A and 5B, and also in FIGS. 6A-6C) between the first and second wheel coupling components 224, 226, the generated torque force can be transmitted to the second wheel coupling component 226, before subsequently being transmitted to the torque receiver 214, effectively creating a left hand device. Furthermore, as the freewheel 222 rotates about the axle receiver 228, the freewheel 222 will intensify its coupling to the second wheel coupling component 226 by continuously threading into the second wheel coupling component 226, thereby tighten the engagements between the freewheel 222, the first wheel coupling component 224 and the second wheel coupling component 226.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A wheel coupling system comprising:
 a torque transmission element having a rotatable member to generate a torque force;
 a wheel having a first side and a second side adjacently situated to the torque transmission element; and
 a torque receiver independent of the wheel and the torque transmitting member and situated between the torque transmitting member and the second side of the wheel, the torque receiver being coupled to the wheel for releasably engaging the torque transmission element, such that removal of the wheel disengages the torque receiver from the torque transmission element to allow the torque transmission element to remain intact.

2. The system of claim 1, wherein the torque transmission element further includes a first wheel coupling component and a second wheel coupling component coupled to the rotatable member, the first and second wheel coupling components having threaded surfaces to facilitate transmission of the torque force.

3. The system of claim 2, wherein the rotatable member is a freewheel equipped with directional threads for transmitting the torque force to the first and/or second wheel coupling component.

4. The system of claim 2, wherein the first wheel coupling component includes a bearing portion for facilitating a complementary coupling with the torque receiver.

5. The system of claim 2, wherein the first wheel coupling component includes a threaded portion for receiving the torque force from the rotatable member.

6. The system of claim 2, wherein the torque transmission element includes an axle receiver with a receiving section for providing support to the first wheel coupling component, the second wheel coupling component and the rotatable member.

7. The system of claim 1, wherein the torque receiver includes a recess for facilitating a complimentarily coupling with the torque transmission element.

8. The system of claim 1 further including a wheel hub, the wheel hub having an interface portion for coupling the torque receiver and for receiving the torque force from the torque receiver.

9. A torque transmission apparatus comprising:
 a rotatable member for generating a torque force, the rotatable member having an outer surface along which torque forces can be applied;
 a torque transferring member coupled to the rotatable member, the torque transferring member having a bearing section for transferring the generated torque force; and
 a torque receiver independent of the torque transmitting member and situated between the torque transmitting member and a side of a wheel, the torque receiver complementarily coupled to the torque transferring member for receiving the generated torque force such that a removal of the torque receiver from the torque transferring member leaves the torque transferring member and the rotatable member intact.

10. The torque transmission apparatus of claim 9, wherein the rotatable member is a freewheel having a threaded surface for facilitating a coupling to the torque transferring member.

11. The torque transmission apparatus of claim 9, wherein the outer surface includes a plurality of gear teeth for facilitate a coupling with the torque transferring member.

12. The torque transmission apparatus of claim 11, wherein the torque transferring member includes a second bearing section for the complementary coupling with the torque receiver.

13. The torque transmission apparatus of claim 9, the torque transferring member further including a thread section for engaging a second torque transferring member.

14. The torque transmission apparatus of claim 9, wherein the torque receiver further includes a hollowed center for accommodating a portion of an axle.

15. The torque transmission apparatus of claim 14, wherein the torque receiver further include a plurality of bolt bores for accommodating one or more bolts.

16. The torque transmission apparatus of claim 9, wherein the torque receiver further includes a recess for complementary coupling with the wheel hub, the wheel hub having an interface section for receiving the torque force from the torque receiver.

17. A method for removing a wheel from a vehicle, the method comprising:
 locating an engagement mechanism for connecting the wheel to a torque receiver and a torque transmission element, the torque transmission element having a rotatable member rotatably actuated by a chain for generating torque forces to rotate the wheel, and the torque receiver independent of the wheel and the torque transmitting member and situated between the torque transmitting member and a side of the wheel, the torque receiver being coupled to the wheel for releasably engaging the torque transmission element;
 actuating the engagement mechanism to disengage the connection between the wheel, the torque receiver, and the torque transmission element; and
 removing the wheel and the torque receiver from the torque transmission element while leaving the torque transmission element intact and coupled to the chain.

18. The method of claim 17, wherein the step of locating the engagement mechanism includes identifying and locating a push button for releasing a locking mechanism from locking the wheel to the torque transmission element.

19. The method of claim 18, wherein the step of actuating the engagement mechanism includes pushing the push button to release the locking mechanism from locking the wheel to the torque transmission element.

20. The method of claim 18, wherein the step of removing the wheel includes removing an axle from the torque transmission element, the axle having the locking mechanism for locking the axle with the torque transmission element.

* * * * *